(12) United States Patent
Kunze et al.

(10) Patent No.: US 7,000,098 B2
(45) Date of Patent: Feb. 14, 2006

(54) PASSING A RECEIVED PACKET FOR MODIFYING PIPELINING PROCESSING ENGINES' ROUTINE INSTRUCTIONS

(75) Inventors: Aaron R. Kunze, Portland, OR (US); Erik J. Johnson, Portland, OR (US); David M. Putzolu, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 10/279,590

(22) Filed: Oct. 24, 2002

(65) Prior Publication Data

US 2004/0083354 A1    Apr. 29, 2004

(51) Int. Cl.
*G06F 9/44*     (2006.01)
(52) U.S. Cl. ............... 712/248; 712/25; 712/30; 712/201
(58) Field of Classification Search ........... 712/201; 717/173
See application file for complete search history.

(56) References Cited

U.S. PATENT DOCUMENTS

| | | | |
|---|---|---|---|
| 5,696,920 A * | 12/1997 | Miyata et al. | 712/201 |
| 6,172,990 B1 * | 1/2001 | Deb et al. | 370/474 |
| 2003/0158759 A1 * | 8/2003 | Kannenberg | 705/4 |

OTHER PUBLICATIONS

Intel Network Infrastructure Processors, Extending Intelligence in the Network, Intel in Communications, Intel Literatute Center, 16 pages.
Intel XScale Microarchitecture, Technical Summary 14 pages.
Intel XScale Core, Developers Manual, Dec. 2000, 220 pages.
Tennenhouse et al, "A Survey of Active Network Research" IEEE Communications Magazine vol. 35, No. 1, Jan. 1997.
INTEL, IXP1200 Network Processor Family, Hardware Reference Manual, Dec. 2001, pp. 17-50.

* cited by examiner

*Primary Examiner*—Kenneth S. Kim
(74) *Attorney, Agent, or Firm*—Robert A. Greenberg (57) ABSTRACT

In one embodiment, a method is provided. The method of this embodiment includes generating, by a processor that includes a plurality of processing engines capable of executing program instructions, a packet. The method of this embodiment also includes transmitting the packet to at least one of the processing engines. Additionally, the method of this embodiment also includes, in response, at least in part to receipt of the packet by the at least one of the processing engines, modifying at least in part, by the at least one of the processing engines, a set of program instructions that the at least one processing engine is capable of executing. Of course, many modifications, variations, and alternatives are possible without departing from this embodiment.

16 Claims, 8 Drawing Sheets

PASSING A RECEIVED PACKET FOR MODIFYING PIPELINING PROCESSING ENGINES' ROUTINE INSTRUCTIONS

FIELD

This disclosure relates to the field of processor programming.

BACKGROUND

One conventional parallel processor includes a plurality of micro-engines and circuitry to load program code into program code memories in the micro-engines. In operation of this conventional parallel processor, the circuitry loads the program code into the program code memories during a boot process, executed as a result of a reset of parallel processor. After the circuitry has completed loading of the program code into the program code memories and the boot process has completed, the micro-engines may begin executing the program code loaded in the program code memories. The execution of the program code loaded in the program code memories may result in the micro-engines manipulating and/or modifying, in accordance with the program code, data transmitted to the micro-engines for processing by the micro-engines.

In this conventional parallel processor, the program code loaded in the program code memories may not be modified unless all of the micro-engines have halted execution of the program code. That is, in this conventional parallel processor, while the micro-engines are executing the program code loaded in the program codes memories, the program code loaded in the program code memories may not be modified. While the micro-engines have halted execution of this program code, the micro-engines may be unable to manipulate and/or modify data transmitted to the micro-engines for processing by the micro-engines. Additionally, the halting of execution of the program code by the micro-engines may result in corruption and/or loss of data that was in the process of being manipulated and/or modified by the micro-engines when the halting of such execution occurred.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
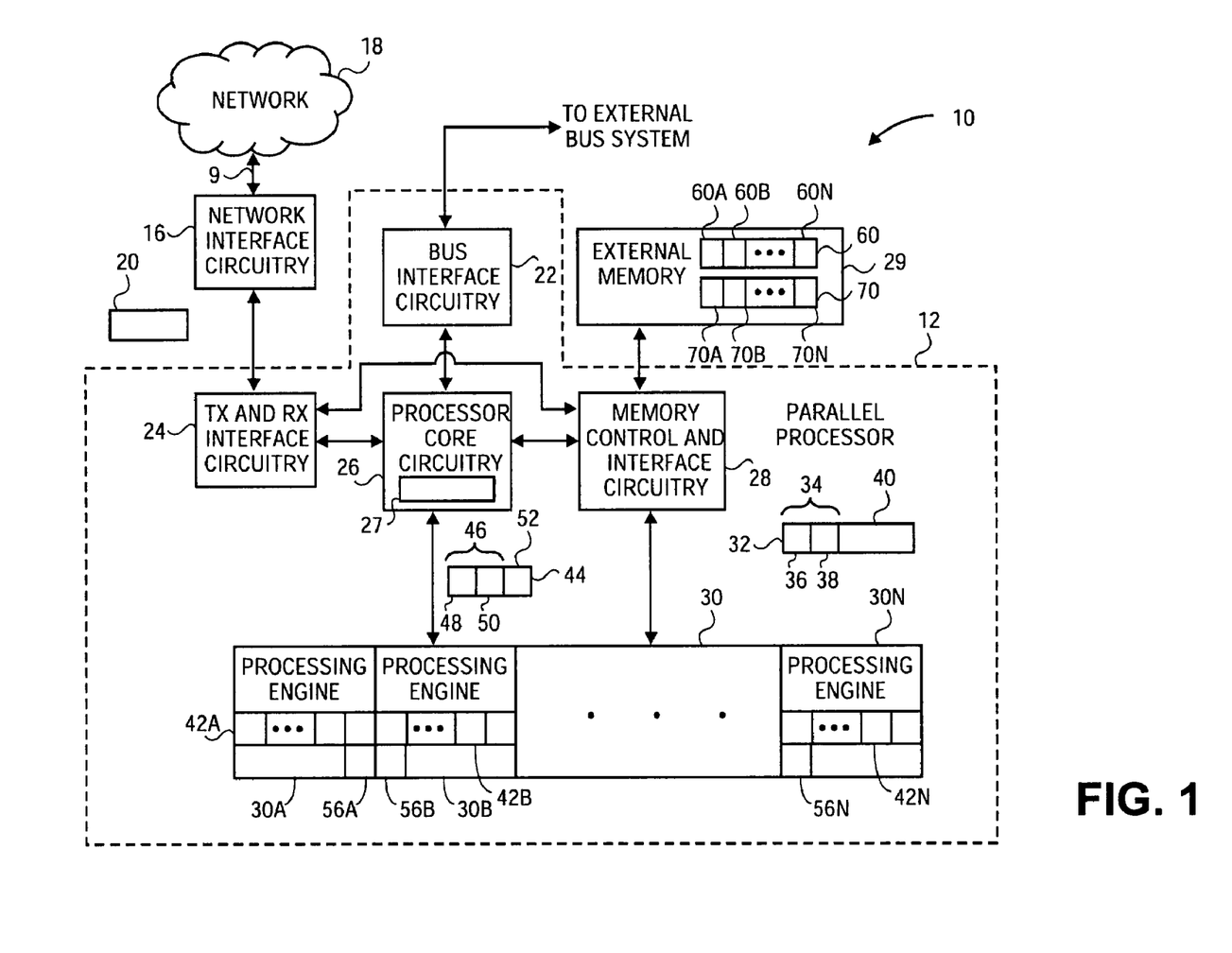
FIG. 1 is a diagram illustrating a system embodiment.

FIG. 1 illustrates a system embodiment. As shown in FIG. 1, system 10 may include a parallel processor 12. Parallel processor 12 may include, for example, transmit and receive interface circuitry 24, bus interface circuitry 22, memory control and interface circuitry 28, processor core circuitry 26, and a plurality of processing engines (collectively referred to by the numeral 30 in FIG. 1). Each of the processing engines 30 may be operatively coupled to processor core circuitry 26 and memory control and interface circuitry 28. Processor core circuitry 26 may be operatively coupled to transmit and receive interface circuitry 24, memory control and interface circuitry 28, and bus interface circuitry 22. Memory control and interface circuitry 28 may be operatively coupled to external memory 29 and to transmit and receive interface circuitry 24.

Bus interface circuitry 22 may be operatively coupled to an external bus system (not shown). This external bus system may comprise, for example, a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, this external bus may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, this external bus may comprise other types and configurations of bus systems, without departing from this embodiment. This external bus system may couple bus interface circuitry 22 to an external control device, such as, for example, a host processor (not shown) that may exchange data and/or commands with processor core circuitry 26 via the external bus system and bus interface circuitry 22. By exchanging such data and/or commands with processor core circuitry 26, the host processor may control and/or monitor operation of parallel processor 12.

Memory control and interface circuitry 28 may exchange control and/or data signals from processing engines 30, processor core circuitry 26, and/or transmit and receive circuitry 24. By exchanging such control and/or data signals with circuitry 28, circuitry 24, circuitry 26, and/or each of the processing engines 30 may control and/or monitor the operation of circuitry 28. For example, circuitry 24, circuitry 26, and/or each of the processing engines 30 may exchange control and/or data signals with circuitry 28 that may result in circuitry 28 signaling external memory 29 to store data in external memory 29, and/or to retrieve data from external memory 29, in a manner specified and/or indicated by such control and/or data signals. In this embodiment, external memory 29 may comprise computer-readable memory, such as, for example, double data rate (DDR) synchronized dynamic random access memory (SDRAM), quad data rate (QDR) static random access memory (SRAM), and/or other types of RAM and/or read only memory (ROM).

Transmit and receive interface circuitry 24 may be operatively coupled to network interface circuitry 16. Network interface circuitry 16 may be operatively coupled via one or more network communications links 9 to one or more local and/or wide area communications networks (hereinafter collectively or singly referred to a "network 18"). Circuitry 16 may exchange data and/or commands with network 18, via one or more network communication links 9, using one or more of a variety of different communication protocols, e.g., Fibre Channel (FC), Ethernet, and/or Transmission Control Protocol/Internet Protocol (TCP/IP) communication protocol. Of course, alternatively, circuitry 16 may exchange data and/or commands with network 18 using other communication protocols, without departing from this embodiment of the claimed subject matter.

In accordance with this embodiment, if a FC protocol is used by circuitry 16 to exchange data and/or commands with network 18, it may comply or be compatible with the interface/protocol described in ANSI Standard Fibre Channel (FC) Physical and Signaling Interface-3 X3.303:1998 Specification. Alternatively or additionally, if an Ethernet protocol is used by circuitry 16 to exchange data and/or commands with network 18, it may comply or be compatible with the protocol described in Institute of Electrical and Electronics Engineers, Inc. (IEEE) Std. 802.3, 2000 Edition, published on Oct. 20, 2000. Also alternatively or additionally, if TCP/IP is used by circuitry 16 to exchange data and/or commands with network 18, it may comply or be compatible with the protocols described in Internet Engineering Task Force (IETF) Request For Comments (RFC) 791 and 793, published Sep. 1981.

As used herein, a "packet" means a sequence of one or more values that may be transmitted from at least one sender to at least one receiver. Circuitry 24 may permit one or more packets (referred to collectively or singly, and in the singular or plural, hereinafter as "packet 20" shown in FIG. 1) to be exchanged between memory control and interface circuitry 28 and network interface circuitry 16. Depending upon, for example, the communication protocol or protocols used by circuitry 16 to exchange data and/or commands with network 18, each packet 20 may comprise one or more respective datagrams, such as, for example, respective frames and/or fragments thereof in compliance and/or compatible with Ethernet and/or FC protocols, and/or respective TCP/IP packets and/or fragments thereof in compliance and/or compatible with TCP/IP. More specifically, in this embodiment, circuitry 24 may comprise a plurality of programmable network communications media interfaces (not shown). Circuitry 26 may supply one or more control signals to circuitry 24 that may result in circuitry 24 configuring these media interfaces, in a manner consistent with these control signals, so as to comprise data paths that may be used by processor 12 to transmit to circuitry 28 packet 20 received by circuitry 24 from circuitry 16, and also may be used by processor 12 to transmit to circuitry 16 packet 20 transmitted to circuitry 24 from circuitry 28. After circuitry 16 receives from circuitry 28 one or more packets 20, circuitry 16 may convert that packet 20 into a form suitable for transmission over network 18, and may signal circuitry 16. This may result in circuitry 16 transmitting these one or more packets 20 over network 18.

After circuitry 28 receives from circuitry 24 one or more packets 20, circuitry 28 may signal memory 29. This may result in circuitry 28 signaling memory 29 to store these one or more packets in one or more packet processing queues 60 in memory 29. This may result in these one or more packets 20 being so stored in queues 60.

Alternatively, or additionally, circuitry 24 may exchange one or more packets 20 with circuitry 28 via circuitry 26. For example, after circuitry 24 receives one or more packets 20 from circuitry 16, circuitry 24 may transmit the received one or more packets 20 to circuitry 26. Circuitry 26 may signal circuitry 28, which circuitry 28, in response, at least in part thereto, may signal memory 29 to store these one or more packets 20. Also, for example, in response, at least in part, to being signaled by circuitry 26, circuitry 28 may retrieve from memory 29 one or more packets 20 intended to be transmitted by circuitry 24 to circuitry 16, and thence, over network 18. After receiving these one or more packets 20 from memory 29, circuitry 28 may transmit them to circuitry 26, which circuitry 26 may transmit them to circuitry 24 for transmission to circuitry 16. Of course, many other alternatives, variations, and modifications are possible without departing from this embodiment.

In this embodiment, queues 60 may include, for example, a plurality of queues 60A, 60B, . . . 60N that may include one or more input queues (not shown) and one or more output queues (not shown). After a packet 20 is received by circuitry 16, circuitry 16 may append to and/or associate with that packet 20 a value that identifies an input port of circuitry 16 (not shown) via which circuitry 16 received that packet 20 from network 18. Thereafter, circuitry 24 may signal circuitry 28 to store in an input queues in memory 29 the packet 20 and the value (hereinafter termed "input port identification value") that identifies the input port via which the packet 20 was received from network 18 by circuitry 16.

Similarly, memory 29 may contain one or more output queues to store packets 20 that are intended to be transmitted via circuitry 24 to circuitry 16. Each of these output queues may be associated with a respective level of priority of transmission. The circuitry 24 may signal to circuitry 28 to retrieve from memory 29 packets 20 stored therein that are intended for transmission to circuitry 16 in an order defined in accordance with a conventional transmission priority scheme that may be based at least in part upon the sequence order of such packets 20 in the one or more output queues and/or the output ports and/or priority levels associated with the output queues. Each such packet 20 in the one or more output queues may be associated with a respective value that identifies a respective output port of circuitry 16 via which that packet 20 is intended to be transmitted to network 18. Circuitry 28 may retrieve this respective value from memory 29 (e.g., it may be stored in memory 29 appended to or in association with the respective packet 20 which it pertains). Alternatively, circuitry 28 may generate this respective value based upon the respective output queue that contains the respective packet 20 (e.g., each respective output queue may contain packets 20 intended for transmission via only a single respective output port of circuitry 16).

Figure 2:
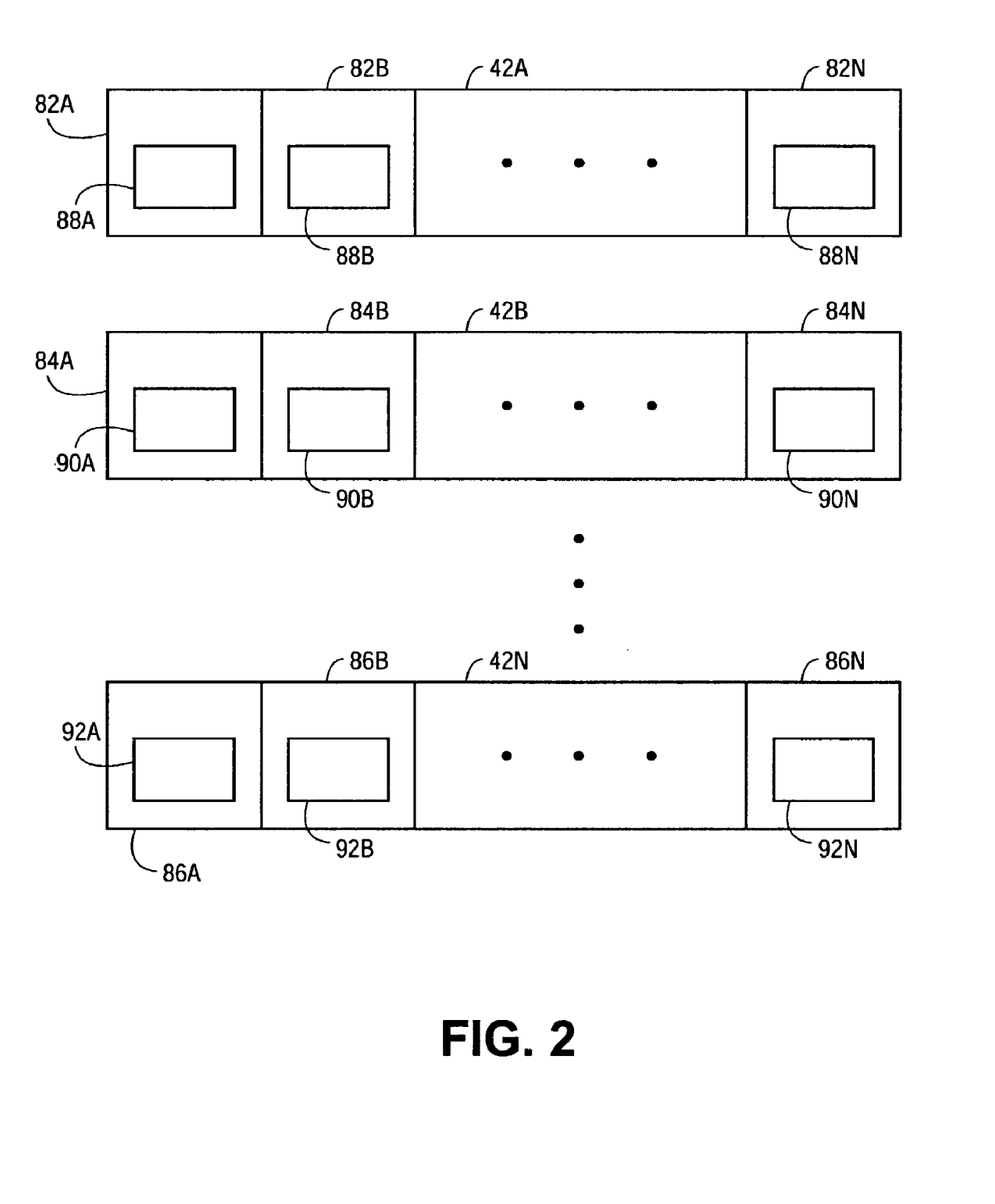
FIG. 2 is a diagram illustrating program instruction memory that may be comprised in the system of FIG. 1.

Processing engines 30 may comprise a plurality of processing engines 30A, 30B, . . . 30N. Processing engines 30A, 30B, . . . 30N may comprise respective central processing units (CPUs) 56A, 56B, . . . 56N and respective program instruction code store memories 42A, 42B, . . . 42N. Each of memories 42A, 42B, . . . 42N may comprise one or more, and in this embodiment, a plurality of respective program instruction memory segments. As used herein, a "memory segment"comprises one or more logical and/or physical regions of memory. For example, as is shown in FIG. 2, memory 42A may include program instruction memory segments 82A, 82B, . . . 82N, memory 42B may include program instruction memory segments 84A, 84B, . . . 84N, and memory 42N may include program instruction memory segments 86A, 86B, . . . 86N, respectively. Each of the program instruction memory segments in memories 42A, 42B, . . . 42N may be loaded with, and store a respective set of micro-code program instructions. Respective CPUs 56A, 56B, . . . 56N may execute the respective sets of program instructions that may be loaded in program memories 42A, 42B, . . . 42N, respectively. The execution by CPUs 56A, 56B, . . . 56N of the respective sets of program instructions that may be loaded in memories 42A, 42B, . . . 42N, respectively, may result in processing engines 30A, 30B, . . . 30N carrying out the operations described herein as being carried out by processing engines 30A, 30B, . . . 30N. The operative circuitry of processing engines 30 may be coupled together via, e.g., one or more bus and/or other interconnection systems (not shown).

The number of processing engines 30 in parallel processor 12 may vary without departing from this embodiment. Also, the number and size of the memory segments in program memories 42A, 42B, . . . 42N may vary without departing from this embodiment. Additionally, the number and size of input and/or output queues comprised in queues 60 may vary without departing from this embodiment.

Processor core circuitry 26 may comprise circuitry compatible and/or in compliance with the Intel® XScale™ micro-architecture of the type with which, e.g., the Intel® IXP 2400 network processor commercially available from the Assignee of the subject application may be compatible and/or comply. Of course, circuitry 26 may comprise other types of processor core circuitry without departing from this embodiment. Processor core circuitry 26 may comprise, for example, computer-readable program instruction memory 27 that may contain micro-code program instructions that processor core circuitry 26 may execute. The execution of these program instructions by circuitry 26 may result in, for example, the carrying out by circuitry 26 of the operations described herein as being carried out by circuitry 26. These and other operations will now be described with reference to FIG. 8.

After, for example, a reset of parallel processor 12, processor core circuitry 26 may load into one or more respective program memory segments of one or more program memories 42A, 42B, . . . 42N one or more respective initial sets of program instructions to be executed by one or more respective CPUs 56A, 56B, . . . 56N in processing engines 30A, 30B, . . . 30N, respectively. For example, as shown in FIG. 2, after such a reset of parallel processor 12, circuitry 26 may signal processing engines 30. This may result in processing engines 30A, 30B, . . . 30N loading into program instruction memories 42A, 42B, . . . 42N respectively, one or more respective initial sets of program instructions. For example, processor 30A may load into segments 82A, 82B, . . . 82N of program memory 42A program instruction sets 88A, 88B, . . . 88N, respectively. Also for example, processor 30B may load into segments 84A, 84B, . . . 84N of program memory 42B program instruction sets 90A, 90B, . . . 90N, respectively. Additionally, for example, processor 30N may load into segments 86A, 86B, . . . 86N of program memory 42N program instruction sets 92A, 92B, . . . 92N, respectively.

Thereafter, processing engines 30A, 30B, . . . 30N, respectively, may execute the respective sets of program instructions loaded into memories 42A, 42B, . . . 42N. As a result of executing these respective sets of program instructions, one or more, and in this embodiment, a plurality of respective pipeline processing stages may be implemented using processing engines 30. Each of these processing stages may perform, using one or more respective processing engines in processor 12, one or more respective operations and/or functions involved in, for example, processing packets 20 received by circuitry 24 from circuitry 16 and stored in memory 29. Depending upon the particular application to which processor 12 is put in system 10, these operations and/or functions may vary. However, for purposes of illustration, examples of such processing stages, and functions and operations that may be performed therein, are described hereafter.

For example, in a first of these processing stages, one of the processing engines (e.g., processing engine 30A) may signal circuitry 28. This may result in circuitry 28 retrieving from memory 29 and providing to processing engine 30A one of the packets 20 received by circuitry 24 from circuitry 16 and stored in memory 29, and the input port identification value associated with that packet. More specifically, the information that may be provided to processing engine 30A as a result of processing engine 30A signaling circuitry 28 may comprise information 32 illustrated in FIG. 1. Information 32 may comprise control information 34 and data payload 40 associated with the packet retrieved by circuitry 28 from memory 29 as a result of processing engine 30A signaling circuitry 28. Control information 34 may include header information 38 from the packet and port identification value 36 associated with that packet. As a result of this first processing stage, processing engine 30A may examine, for example, control information 34 to determine a next subsequent processing stage that is appropriate for the packet given the contents of control information 34. For example, depending upon input port identification value 36 and/or network layer information comprised in header information 38, the next subsequent processing stage that is appropriate for the packet may differ. Based upon the contents of the packet's control information 34, processing engine 30B may determine that a processing stage that utilizes, e.g., processing engine 30B may be the appropriate next subsequent processing stage for the packet. Processing engine 30A may signal processing engine 30B to continue processing of the packet in accordance with the processing stage in which engine 30B is utilized.

Continuing this illustrative example, in the next subsequent processing stage, processing engine 30B may examine network layer information that may be comprised in header information 38 of the packet. Using conventional network forwarding and/or routing algorithms, based, at least in part, upon this network layer information, engine 30B may determine from, e.g., entries in one or more network forwarding and/or routing tables (not shown) stored in memory 29 a destination (e.g., a next hop in network 18) to which to forward the packet. In one or more subsequent processing stages performed using conventional techniques implemented by one or more other processing engines, the contents of the packet may be examined and/or modified, and/or an appropriate output port of circuitry 16 may be selected via which the packet may be forwarded and/or routed, so as to permit the packet to be forwarded and/or routed to that destination. The packet may then be stored in memory 29 until it is retrieved therefrom and forwarded by circuitry 24 to circuitry 16.

As stated above, depending upon the particular application to which processor 12 is put, the operations and/or functions that may be carried out by the processing engines in processor 12 may vary, without departing from this embodiment. For example, if processor 12 is used as an embedded processor in a host system (not shown) that is employed for, e.g., packet pre-processing and/or post-processing operations, the operations and/or functions that may be carried out the processing engines in processor 12 may vary from those described in the above illustrative example, without departing from this embodiment. Of course, other variations, modifications, and/or alternatives to these and other functions and/or operations that may be carried out by these processing engines are possible without departing from this embodiment.

Figure 8:
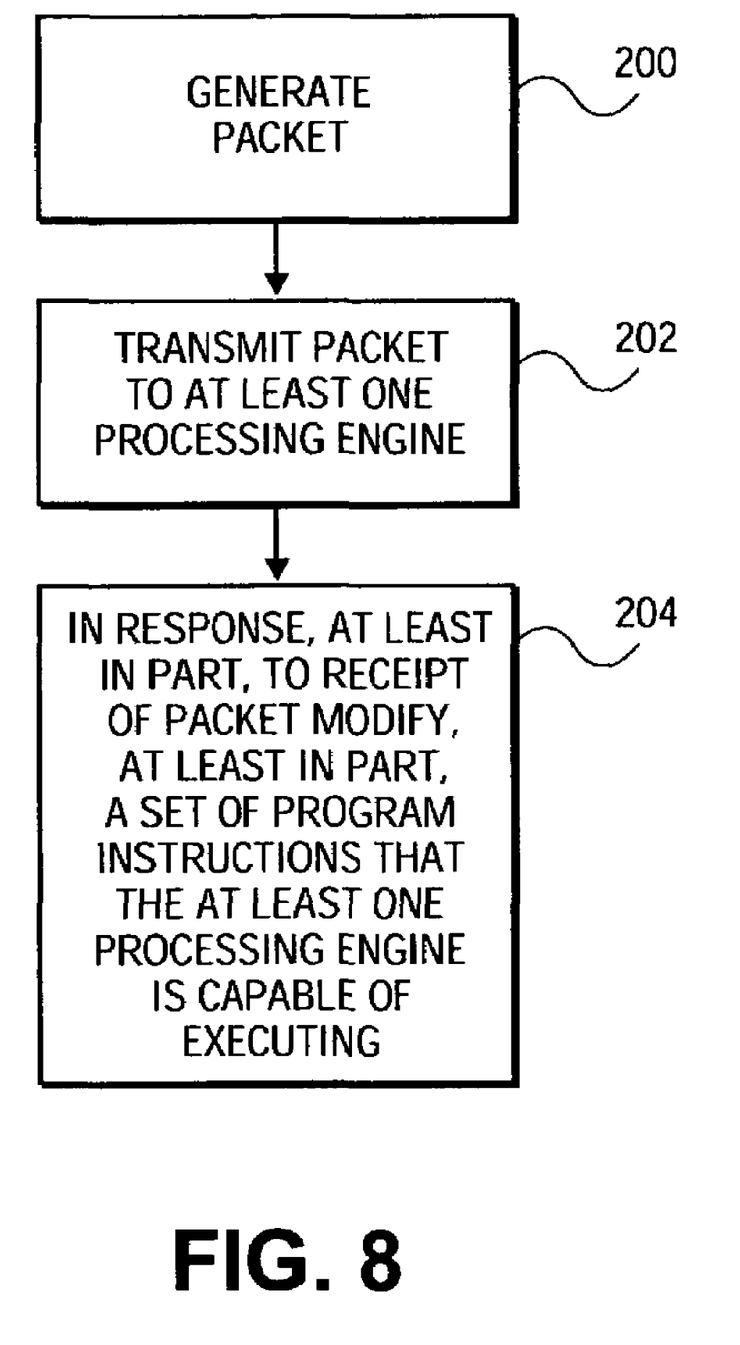
FIG. 8 is a flowchart illustrating operations that may be executed according to an embodiment.

With particular reference now being made to FIG. 8, after the respective initial program instruction sets have been loaded into memories 30A, 30B, . . . 30N, the host processor may signal processor core circuitry 26 via the external bus system and bus interface circuitry 22. This may result in processor core circuitry 26 generating and transmitting to one or more of the processing engines (e.g., processing engine 30A) a packet 44, as illustrated by operations 200 and 202 in FIG. 8. For example, in this embodiment, as a result of operations 200 and 202, circuitry 26 may generate and transmit to processing engine 30A packet 44. In accordance with this embodiment, in response, at least in part, to receipt by processing engine 30A of packet 44, processing engine 30A may modify, at least in part, one or more of the program instructions loaded in memory 42A that CPU 56A in processing engine 30A may be capable of executing, as illustrated by operation 204 in FIG. 8.

More specifically, in this embodiment, packet 44 may comprise control information 46 and data payload 52. Data payload 52 may comprise or specify one or more respective sets of micro-code program instructions that are intended to be used to modify (e.g., overwrite and/or add to) one or more respective initial program instruction sets loaded in one or more of the memories 42A, 42B, . . . 42N. For example, payload 52 may contain one or more sets of program instructions and/or one or more addresses specifying one or more locations from which one or more sets of programs instructions (collectively referred to as "program instructions 70" in FIG. 1) may be retrieved from memory 29. Program instructions 70 may comprise, for example, a plurality of sets of micro-code program instructions 70A, 70B, . . . 70N that are executable by processing elements 30. Control information 46 may comprise a plurality of predetermined values 48 and 50. Predetermined value 50 may identify one or more processing engines 30 that are desired to modify, at least in part, using the one or more program instructions sets contained and/or identified in payload 52, the respective program instructions loaded in their respective program instruction memories. Predetermined value 48 may identify packet 44 as having been generated and issued from circuitry 26. For example, value 48 may comprise a value that identifies a reserved input port that is associated with circuitry 26.

In this embodiment, after processing engine 30A receives packet 44, engine 30A may examine information 46 to verify whether packet 44 has been issued from circuitry 26 and whether processing engine 30A is identified by value 50. Thereafter, if processing engine 30A determines that packet 44 has been issued from circuitry 26 and processing engine 30A is identified by value 50, as a result of performing operation 204, in response at least in part to receipt of packet 44, engine 30A may overwrite one or more of initial program instruction sets 88A, 88B, . . . 88N in segments 82A, 82B, . . . 82N with one or more program instruction sets contained in and/or identified by payload 52. For example, payload 52 and/or value 50 may comprise one or more values that may identify one or more initial program instruction sets in memory 42A that are desired to be overwritten, and one or more corresponding program instruction sets contained in and/or identified by payload 52 that are desired to overwrite them. In accordance with these one or more values comprised in payload 52 and value 50, processing engine 30A may select one or more initial program instruction sets (e.g., program instruction set 88B) to be overwritten, and one or more corresponding program instructions sets contained in and/or identified by payload 52 (e.g., program instruction set 70A in memory 29) to overwrite program instruction set 88B. Processing engine 30A then may signal circuitry 28 to retrieve program instruction set 70A from memory 29, and in response thereto, circuitry 28 may retrieve and supply to engine 30A instruction set 70A. Processing engine 30A may overwrite initial program instruction set 88B in segment 82B with program instruction set 70A. The instructions comprised in set 70A may differ, at least in part, from the instructions comprised in set 88B. Thereafter, CPU 56A may execute instruction set 70B in segment 82B. This may result in one or more changes, at least in part, in one or more functions and/or operations performed by processing engine 30A in the first processing stage.

Conversely, if processing engine 30A determines that processing engine 30A is not identified by value 50 and that circuitry 26 issued packet 44, processing engine 30A may forward packet 44 to a processing engine (e.g., processing engine 30B) used in a next subsequent processing stage. Also conversely, if processing engine 30A determines that circuitry 26 did not issue packet 44, processing engine 30A may cease processing and drop packet 44.

After processing engine 30A has completed operation 204, processing engine 30A may forward packet 44 to a processing engine (e.g., processing engine 30B) used in a next subsequent processing stage. In the same manner as processing engine 30A, processing engine 30B may examine control information 46 and payload 52 and may determine from such examination whether packet 44 has been issued from circuitry 26 and processing engine 30B is identified by value 50. If processing engine 30B determines that packet 44 has been issued from circuitry 26 and processing engine 30B is identified by value 50, processing engine 30B may perform operation 204 in the same manner as processing engine 30A performed operation 204, and may forward packet to a processing engine used in a next subsequent processing stage. Conversely, if processing engine 30B determines that processing engine 30B is not identified by value 50 and that circuitry 26 issued packet 44, processing engine 30B may forward packet 44 to a processing engine used in a next subsequent processing stage. Each processing engine receiving packet 44 after processing engine 30B may perform the same operations performed by processing engine 30B, until processing engines involved in all of the processing stages have received packet 44.

Figure 3:
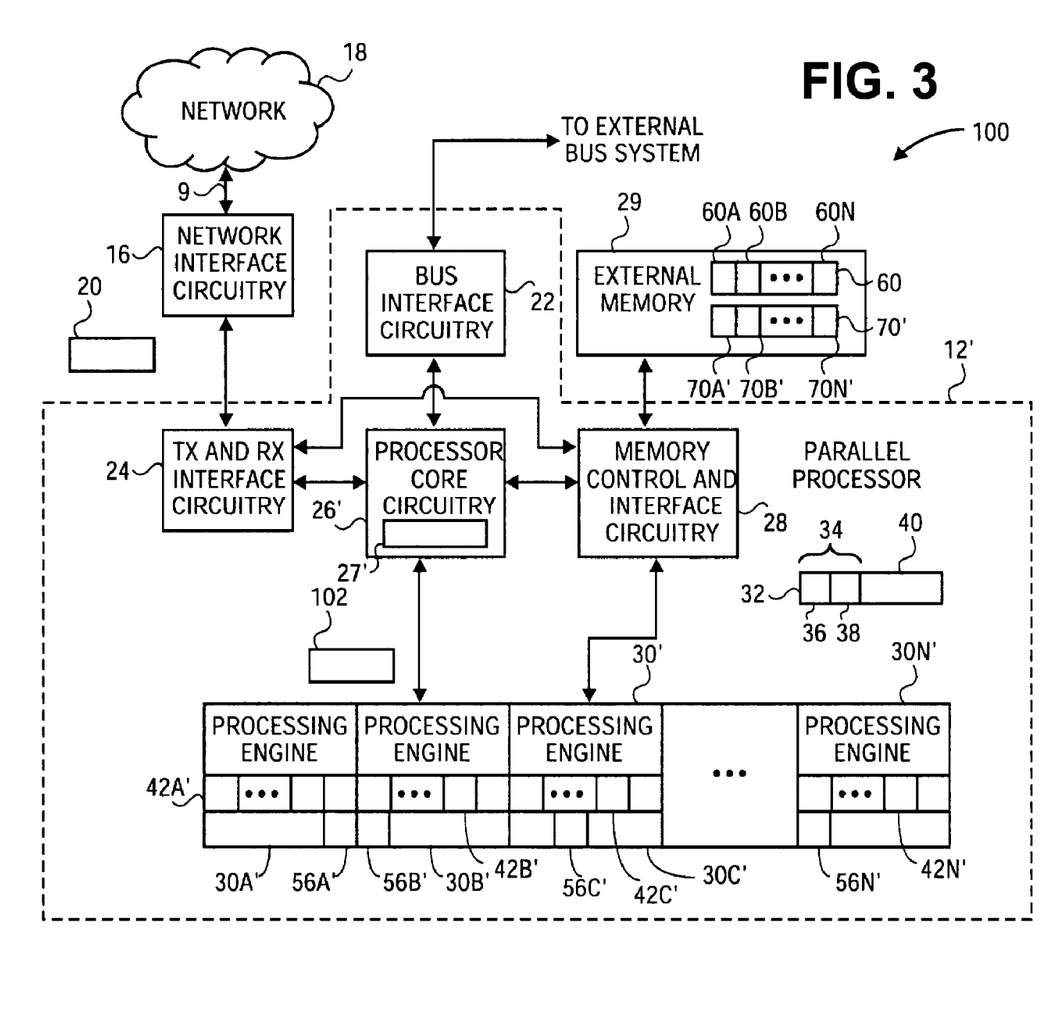
FIG. 3 is a diagram illustrating another system embodiment.
Figure 4:
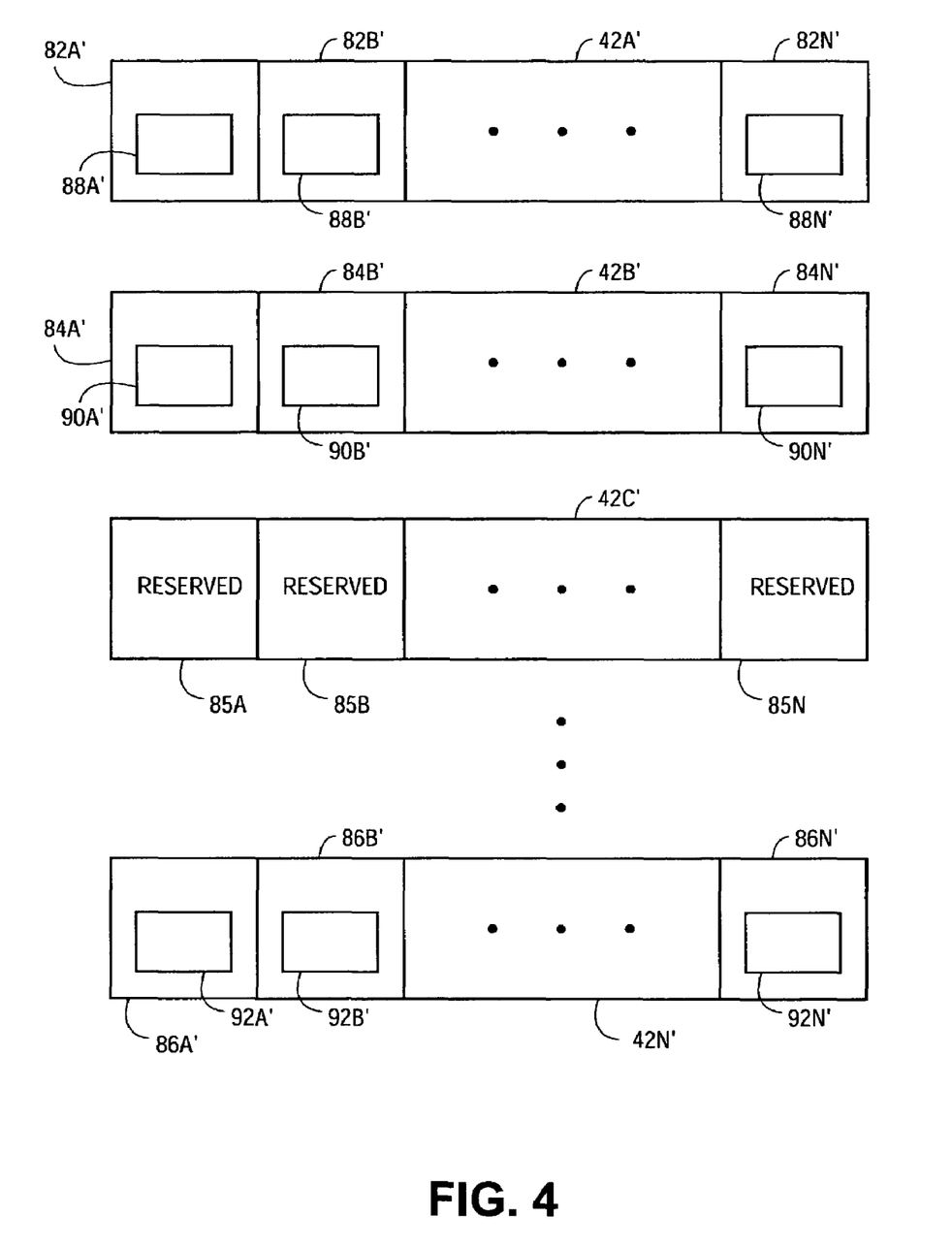
FIGS. 4, 5, 6, and 7 illustrate program instruction memory that may be comprised in the system of FIG. 3.

FIG. 3 illustrates another system embodiment. Except as stated to the contrary herein, the construction and operation of system 10 shown in FIG. 1 may be substantially identical to the construction and operation of system 100 shown in FIG. 3. In system 100, processing engines 30' may comprise a plurality of processing engines 30A', 30B', 30C', . . . 30N'. Processing engines 30A', 30B', 3OC' . . . 30N' may comprise respective central processing units (CPUs) 56A', 56B', 56C' . . . 56N' and respective program instruction code store memories 42A', 42B', 42C' . . . 42N'. Each of memories 42A', 42B', 42C' . . . 42N' may comprise one or more, and in this embodiment, a plurality of respective program instruction memory segments. For example, as is shown in FIG. 4, memory 42A' may include program instruction memory segments 82A', 82B', . . . 82N', memory 42B' may include program instruction memory segments 84A', 84B', . . . 84N', memory 42C' may include program instruction memory segments 85A, 85B, . . . 85N, and memory 42N' may include program instruction memory segments 86A', 86B', . . . 86N', respectively. Each of the program instruction memory segments in memories 42A', 42B', 42C' . . . 42N' is capable of being loaded with, and capable of storing a respective set of micro-code program instructions. Respective CPUs 56A', 56B', 56C' . . . 56N' may be capable of executing the respective sets of program instructions that may be loaded in program memories 42A', 42B', 42C' . . . 42N', respectively. The execution by CPUs 56A', 56B', 56C' . . . 56N' of the respective sets of program instructions that may be loaded in memories 42A', 42B', 42C' ... 42N', respectively, may result in processing engines 30A', 30B', 30C' ... 30N' carrying out the operations described herein as being carried out by processing engines 30A', 30B', 30C' ... 30N'. The operative circuitry of processing engines 30' may be coupled together via, e.g., one or more bus and/or other interconnection systems (not shown).

The number of processing engines 30' in parallel processor 12' may vary without departing from this embodiment. Also, the number and size of the memory segments in program memories 42A', 42B', 42C' ... 42N' may vary without departing from this embodiment.

Processor core circuitry 26' may comprise circuitry compatible and/or in compliance with the Intel® XScale™ micro-architecture of the type with which, e.g., the Intel® IXP 2400 network processor commercially available from the Assignee of the subject application may be compatible and/or comply. Of course, circuitry 26' may comprise other types of processor core circuitry without departing from this embodiment. Processor core circuitry 26' may comprise, for example, computer-readable program instruction memory 27' that may contain micro-code program instructions that processor core circuitry 26' may execute. The execution of these program instructions by circuitry 26' may result in, for example, the carrying out by circuitry 26' of the operations described herein as being carried out by circuitry 26'. These and other operations will now be described with reference to FIG. 9.

After, for example, a reset of parallel processor 12', processor core circuitry 26' may load into one or more respective program memory segments of one or more program memories (e.g., program memories 42A', 42B', and 42N') one or more respective initial sets of program instructions to be executed by one or more respective CPUs (e.g., CPUs 56A', 56B', and 56N') in the one or more respective processing engines (e.g., processing engines 30A', 30B', ... 30N', respectively) that may comprise these one or more program memories.

However, processor core circuitry 26' may designate, as reserved, one or more respective program instruction memory segments of one or more respective program instruction memories (e.g., program instruction memory 42C' in processing engine 30C'). As a result of so designating these one or more respective program instruction memory segments of memory 42C', processor core circuitry 26' may not load into these one or more respective program instruction memory segments of memory 42C' one or more respective initial sets of program instructions.

For example, after such a reset of parallel processor 12', circuitry 26' may signal processing engines 30A', 30B', and 30N'. This may result in processing engines 30A', 30B', and 30N' loading into program instruction memories 42A', 42B', and 42N', respectively, one or more respective initial sets of program instructions, as shown in FIG. 4. For example, processor 30A' may load into segments 82A', 82B', ... 82N' of program memory 42A' program instruction sets 88A', 88B', ... 88N', respectively. Also for example, processor 30B' may load into segments 84A', 84B', ... 84N' of program memory 42B' program instruction sets 90A', 90B', ... 90N', respectively. Additionally, for example, processor 30N' may load into segments 86A', 86B', ... 86N' of program memory 42N' program instruction sets 92A', 92B', ... 92N', respectively. However, circuitry 26' may designate program instruction memory 42C' as being reserved. More specifically, in this example, circuitry 26' may designate program memory segments 85A, 85B, ... 85N of memory 42C' as being reserved. This may result in circuitry 26' not signaling processing engine 30C' to load respective initial sets of program instructions into segments 85A, 85B, ... 85C.

Thereafter, processing engines 30A', 30B', and 30N', respectively, may execute the respective sets of program instructions loaded into memories 42A', 42B', and 42N'. As a result of executing these respective sets of program instructions, one or more, and in this embodiment, a plurality of respective pipeline processing stages may be implemented using processing engines 30A', 30B', and 30N'. Each of these processing stages may perform, using one or more of processing engines 30A', 30B', and 30N', one or more respective operations and/or functions involved in, for example, processing packets 20 received by circuitry 24 from circuitry 16 and stored in memory 29. Depending upon the particular application to which processor 12' is put in system 100, these operations and/or functions may vary. However, for purposes of illustration, the functions and operations that may be performed in such processing stages may be substantially identical to the functions and operations that may be performed in the processing stages implemented using processing engines 30 in system 10, described previously.

For example, the processing stages implemented using processing engines 30A', 30B', and 30N' may retrieve and process, as input, data and/or other information, such as, for example, one or more packets 20, one or more portions thereof, and/or associated information stored in one or more respective queues in queues 60 that may be associated with such processing stages. The processing stages implemented using engines 30A', 30B', and 30N' may generate and store, as output, similar types of data and/or information in one or more other respective queues in queues 60 that may be associated with such processing stages.

For example, a first processing stage may use processing engine 30'. In this first processing stage, processing engine 30A' may examine, for example, control information 34 in a packet 20 being processed in the first processing stage to determine a next subsequent processing stage that is appropriate for the packet given the contents of control information 34. Based upon the contents of the packet's control information 34, processing engine 30B' may determine that a processing stage that utilizes, e.g., processing engine 30B' may be the appropriate next subsequent processing stage for the packet, and may forward the packet to that processing engine 30B'.

Continuing this illustrative example, in the next subsequent processing stage, processing engine 30B' may examine network layer information that may be comprised in header information 38 of the packet. Using conventional network forwarding and/or routing algorithms, based, at least in part, upon this network layer information, engine 30B' may determine from, e.g., entries in one or more network forwarding and/or routing tables (not shown) stored in memory 29 a destination (e.g., a next hop in network 18) to which to forward the packet. In one or more subsequent processing stages performed using conventional techniques implemented by one or more other processing engines, the contents of the packet may be examined and/or modified, and/or an appropriate output port of circuitry 16 may be selected via which the packet may be forwarded and/or routed, so as to permit the packet to be forwarded and/or routed to that destination. The packet may then be stored in an output queue in memory 29 until it is retrieved therefrom and forwarded by circuitry 24 to circuitry 16.

Figure 9:
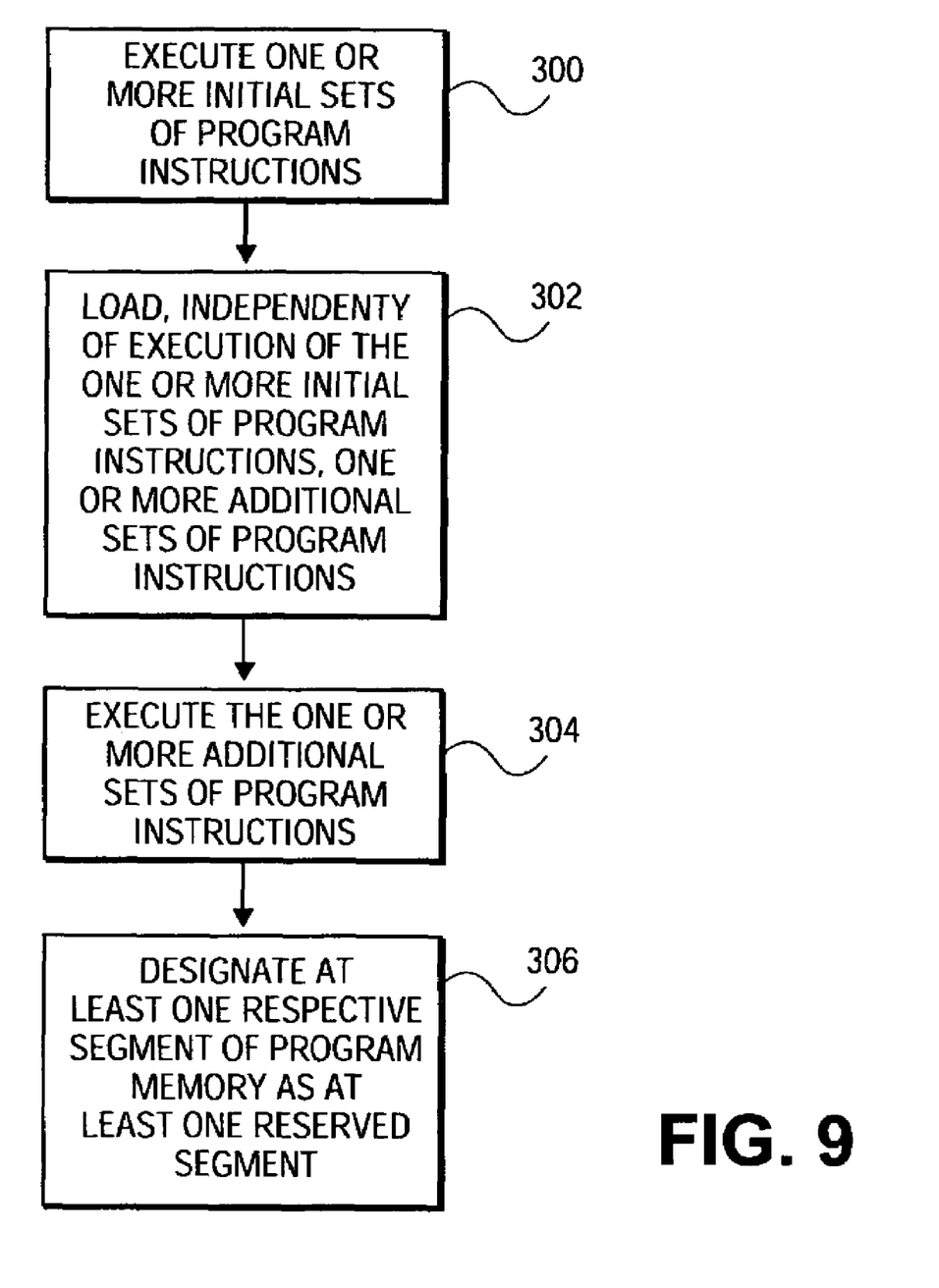
FIG. 9 is a flowchart illustrating operations that may be executed according to another embodiment.

After the respective initial program instruction sets have been loaded into memories 42A', 42B', and 42N', CPUs 56A', 56B', and 56N' in processing engines 30A', 30B', and 30N' may execute these respective initial program instruction sets, as illustrated by operation 300 in FIG. 9. This may result in processing engines 30A', 30B', and 30N' implementing the processing stages described previously. Thereafter, the host processor may signal processor core circuitry 26' via the external bus system and bus interface circuitry 22. This may result in processor core circuitry 26' generating and transmitting to one or more of processing engines (e.g., processing engine 30C') comprising one or more program instruction memory segments previously designated as reserved, a command 102.

Figure 5:
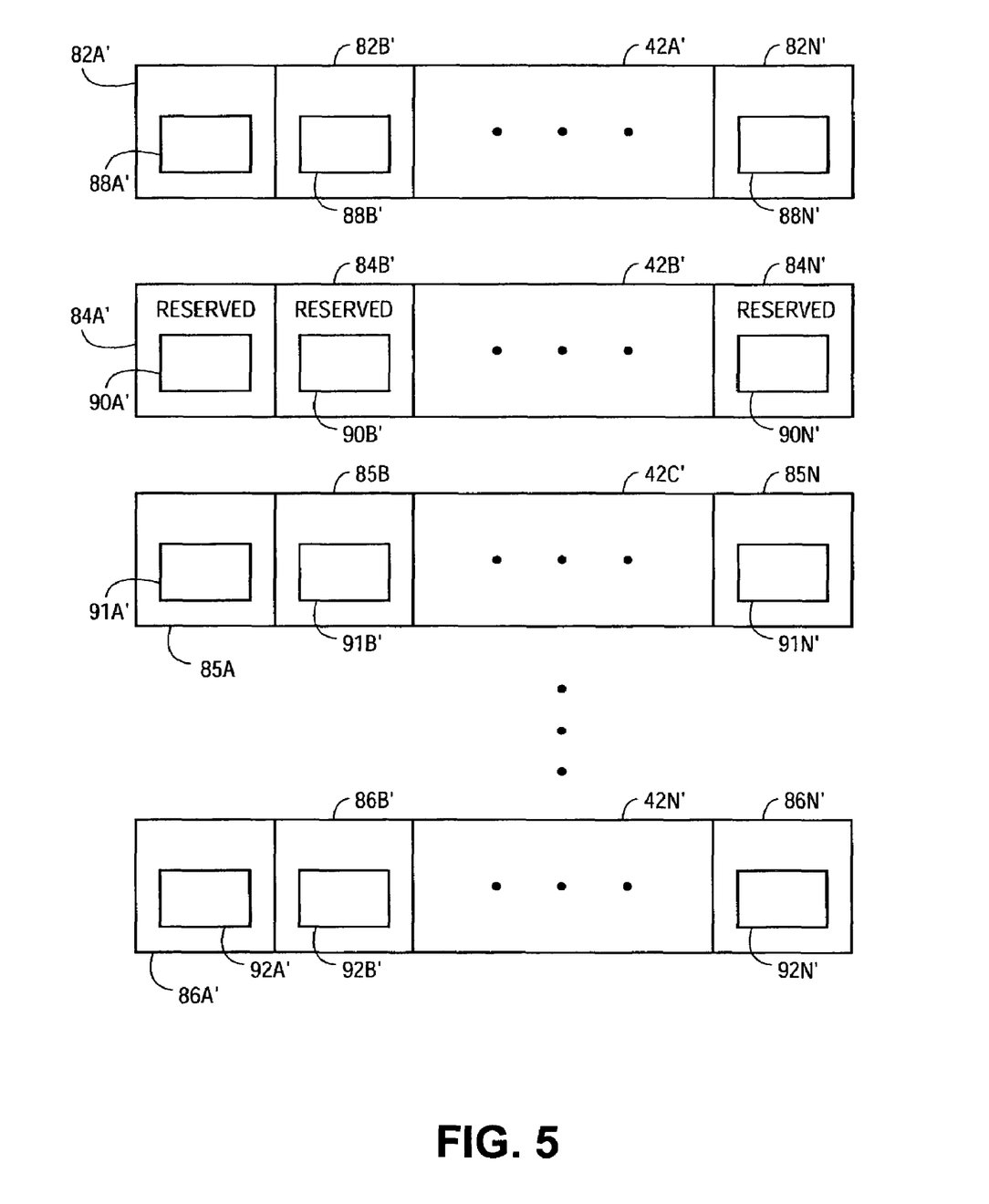
Figure 6:
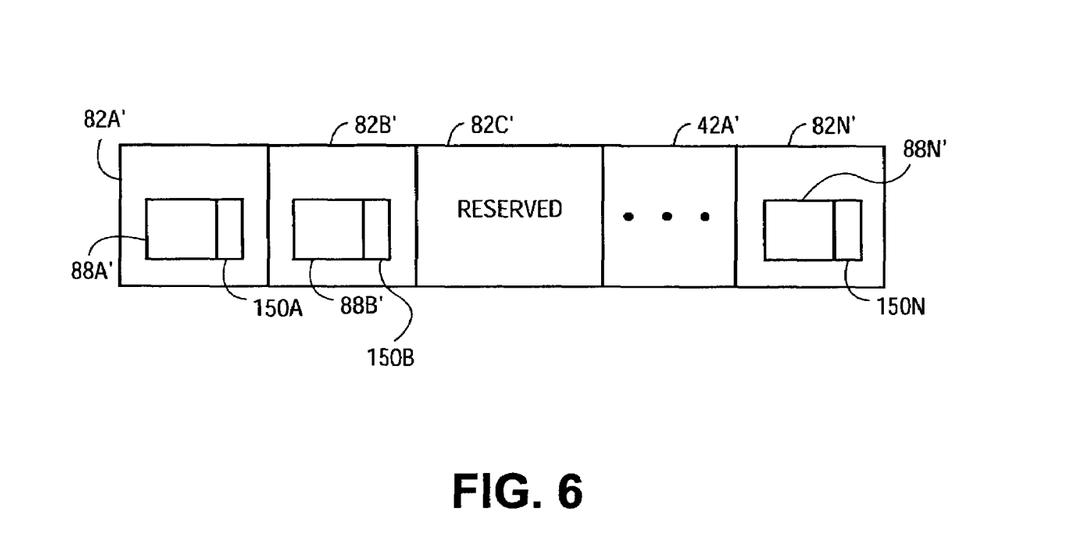
Figure 7:
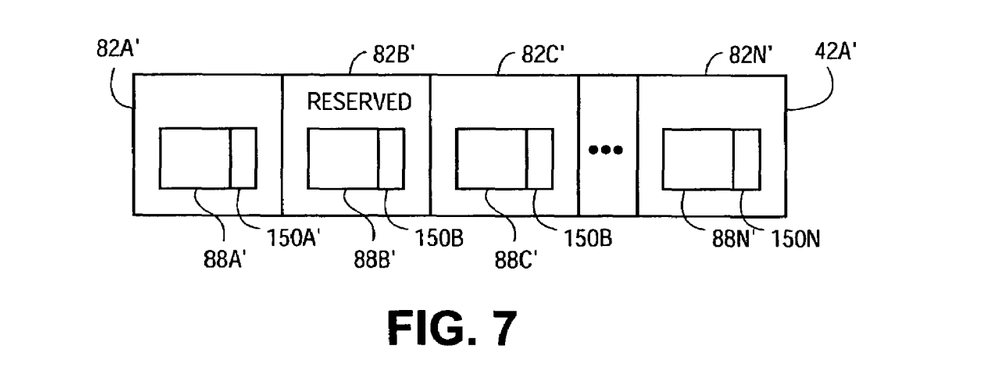

In accordance with this embodiment, in response, at least in part, to receipt by processing engine 30C' of command 102, processing engine 30C' may load, independently of execution of one or more initial sets of program instructions loaded in program instruction memories 42A', 42B', and 42N', one or more additional sets of program instructions (collectively referred to by numeral 70' in FIG. 3) into one or more of program memory segments 85A, 85B, . . . 85N in program instruction memory 42C' previously designated by circuitry 26' as reserved, as illustrated by operation 302 in FIG. 9. These one or more additional sets of program instructions may be specified and/or identified, for example, in command 102, and may comprise a plurality of additional sets of program instructions 70A', 70B', . . . 70N' stored in, for example, external memory 29. After completing the loading of these additional sets of program instructions into memory 42C', memory segments 85A, 85B, . . . 85N may store additional program instruction sets 91A', 91B', . . . 91N', respectively, as shown in FIG. 5. In this embodiment, program instruction sets 91A', 91B', . . . 91N' may correspond to, for example, additional program instruction sets 70A', 70B', . . . 70N', respectively.

As part of operation 302, circuitry 26 may signal circuitry 28 and processing engine 30A'. The signaling by circuitry 26 of circuitry 28 may result in circuitry 28 signaling memory 29 to generate one or more additional queues (e.g., queue 60A) in queues 60. Additional queue 60A may be associated with and contain data and/or other information that may be retrieved and processed, as input, by a processing stage that uses processing engine 30C'. The signaling of processing engine 30A' may result in processing engine 30A' ceasing to store in one or more queues (e.g., queue 60B) in queues 60 data and/or other information generated, as output, by the first processing stage that uses processing engine 30A', and thereafter, also may result in processing engine 30A' beginning to store such data and/or other information in additional queue 60A.

Prior to this, data and/or other information contained in queue 60B may have been retrieved and processed, as input, by processing engine 30B', and processing engine 30B' may have stored in one or more other queues (e.g., queue 60N), as output of the processing stage that uses processing engine 30B', additional data and/or information intended to be retrieved and processed, as input, by a subsequent processing stage that uses another processing engine (e.g., processing engine 30N'). However, in this embodiment, prior to, or contemporaneous with execution of operation 302, as a result, at least in part, of the signaling of circuitry 26' by the host processor, circuitry 26' may designate, as reserved, one or more of the program memory segments (e.g., memory segments 84A', 84B', . . . 84N') of program instruction memory 42B', as illustrated by operation 306 in FIG. 9. Also as part of operation 306, circuitry 26' may signal processing engine 30B'. This may result in processing engine 30B' no longer retrieving data and/or information from queue 60B, and no longer storing in queue 60N additional data and/or information, and no longer executing program instruction sets 90A', 90B', . . . 90N', shown in FIG. 5.

As illustrated by operation 304 in FIG. 9, contemporaneous with, or after execution of operation 306, CPU 56C' may begin executing program instruction sets 91A', 91B', . . . 91N' (see FIG. 5) loaded in program instruction code memory segments 85A, 85B, . . . 85N shown in FIG. 5. The execution of program instruction sets 91A', 91B', . . . 91N' by CPU 56C' may result in, for example, processing engine 30C' retrieving and processing, as input, to a processing stage using processing engine 30C', data and/or information from queue 60A; the execution of program instruction sets 91A', 91B', . . . 91N' by CPU 56C' also may result in, for example, processing engine 30C' storing in queue 60N, as output from this processing stage, additional data and/or information intended to be retrieved and processed by the processing stage that uses processing engine 30N'.

Alternatively, or additionally, program instruction code memory 42A' may include program instruction code memory segments 82A', 82B', 82C', . . . 82N', and prior to execution of operation 302 in system 100, circuitry 26' may load into one or more of these memory segments (e.g., memory segments 82A', 82B', and 82N') one or more respective initial sets of micro-code program instructions 88A', 88B', and 88N' that may contain one or more respective program control instructions 150A, 150B, and 150N. Circuitry 26' may designate, as reserved, one or more memory segments (e.g., memory segment 82C') in memory 42A'. Thereafter, as part of operation 300, CPU 56A' may execute initial sets of program instructions 88A', 88B', and 88N'.

CPU 56A' may execute each respective set of program instructions 88A', 88B', and 88N' sequentially, starting with a respective beginning program instruction in each respective set of program instructions, and ending with the respective program control instruction 150A, 150B, and 150N in each respective set of program instructions 88A', 88B', and 88N'. The execution by processing engine 56A' of program control instruction 150A may result an unconditional jump to, and commencement of execution by CPU 56A' of, the beginning program instruction in program instruction set 88B'. The execution by processing engine 56A' of program control instruction 150B may result an unconditional jump to, and commencement of execution by CPU 56A' of, the beginning program instruction in program instruction set 88N'. The execution by processing engine 56A' of program control instruction 150N may result an unconditional jump to, and commencement of execution by CPU 56A' of, the beginning program instruction in program instruction set 88A'.

After commencement of operation 300, the host processor may signal circuitry 26' via the external bus system and circuitry 22. This may result in circuitry 26' loading, as part of operation 302 illustrated in FIG. 9, independently of execution by CPUs 56A', 56B', and 56N' of the initial sets of program instructions previously loaded into memories 42A', 42B', and 42N', respectively, into one or more memory segments (e.g., reserved memory segment 82C') of memory 42A that have previously been designated by circuitry 26' as reserved, one or more respective sets of additional program instructions (e.g., additional program instructions 88C'). The program instructions comprised in program instruction set 88C' may differ, at least in part, from the program instructions comprised in program instruction set 88B', such that, when program instruction set 88C' is executed by CPU 56A', the functions and/or operations that may be performed in the first processing stage as a result of executing program instruction set 88C' may differ, at least in part, from the functions and/or operations that may be performed in the first processing stage as a result of executing program instruction set 88B'.

In this embodiment, prior to, or contemporaneous with execution of operation 302, as a result, at least in part, of the signaling of circuitry 26' by the host processor, circuitry 26' may designate, as part of operation 306, one or more of the program memory segments (e.g., memory segments 82B') of program instruction memory 42A', as reserved, that were not previously so designed by circuitry 26'. Also as part of operation 306, circuitry 26' may signal processing engine 30A'. This may result in program control instruction 150A being overwritten with program control instruction 150A'. The execution by CPU 56A' of program control instruction 150A' may result an unconditional jump to, and commencement of execution by CPU 56A' of, the beginning program instruction in program instruction set 88C'. Thereafter, CPU 56A' may continue executing, in sequence, the program instructions comprised in program instruction set 88C', until CPU 56A' executes program control instruction 150B in instruction set 88C'. That is, after instruction set 88C' has been loaded into segment 82C' and program control instruction 150A has been overwritten with program control instruction 150A', the flow of program instructions executed by CPU 56A' may by-pass instruction set 88B', and CPU 56A' may execute, as part of operation 304, program instruction sets 88A', 88C', and 88N'.

Thus, in summary, one system embodiment may comprise one or more network communication links, and a processor. In this system embodiment, the processor may comprise a plurality of processing engines capable of executing program instructions. The processor may be capable of receiving and/or transmitting at least one packet via the one or more network communication links. In this system embodiment, the processor also may be capable of generating at least one other packet, and of transmitting the at least one other packet to at least one of the processing engines. In response, at least in part to the receipt of the at least one other packet by the at least one of the processing engines, the at least one of the processing engines of this system embodiment may be capable of modifying at least in part, a set of program instructions that the at least one processing engine may be capable of executing.

In accordance with this embodiment, when the program instructions of at least one of the processing engines is being modified, at least in part, the other processing engines in the processor may continue to perform without interruption functions and/or operations comprised in other processing stages. Thus, advantageously, this permits additional program instructions to be loaded into the program instruction memory of the at least one of the processing engines independently of, and without interrupting the functions and/or operations performed by the other processing engines in processor. Also advantageously, in this embodiment, while the program instruction code executed by the at least one of the processing engines is being modified, at least in part, the processing engines in the processor may continue to operate.

Also, in summary, another system embodiment may comprise one or more network communication links, and a processor. In this other system embodiment, the processor may comprise program instruction memory and one or more processing engines capable of executing one or more initial sets of program instructions stored in one or more respective segments of the program instruction memory. Also, in this other system embodiment, the program instruction memory may comprise one or more reserved segments. The processor of this other system embodiment may be capable of receiving and/or transmitting at least one packet via the one or more network communication links, and also may be capable of loading, independently of the executing by the one or more processing engines of the one or more initial sets of program instructions, one or more additional sets of program instructions into the one or more reserved segments. At least one of the one or more processing engines of this other system embodiment may be capable of executing the one or more additional sets of program instructions.

In accordance with this other system embodiment, when the one or more additional sets of program instructions are being loaded into the one or more reserved segments, the one or more processing engines of the processor may continue to execute the one or more initial sets of program instructions. Thus, advantageously, the one or more additional sets of program instructions to be loaded independently of, and without interrupting the functions and/or operations performed by the one or more processing engines as a result of the execution of the one or more initial sets of program instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
generating a packet by a processor that includes a plurality of processing engines programmed to process a network packet received via a network interface with a pipeline of packet processing stages provided by different ones of the processing engines;
transmitting the generated packet to at least a first one of the processing engines providing at least one stage of the pipeline of packet processing stages; and
in response, at least in part to receipt of the generated packet by the first one of the processing engines, modifying at least in part, by the first one of the processing engines, a first set of program instructions, the first set of programming instructions providing a stage of the pipeline of packet processing stages, the first one of the processincj engines to execute the first set of program instructions after the modifying of the first set of program instructions;
transmitting the generated packet from the first one of the processing engines to a second one of the processing engines providing a next one of the stages of the pipeline of packet processing stages; and
in response, at least in part to receipt of the generated packet by the second one of the processing engines providing the next one of the stages of the pipeline of packet processing stages, modifying at least in part, by the second one of the processing engines, a second set of program instructions, the second set of Drogramming instructions providing a stage of the pipeline of packet processing stages, the second one of the processing engines to execute the second set of program instructions after the modifying of the second set of program instructions.

2. The method of claim 1, wherein:
the modifying, at least in part, of the first set of program instructions by the first one of the processing engines comprises replacing at least one program instruction comprised in the first set of program instructions with at least one other program instruction that is one of comprised and specified, at least in part, in the generated packet.

3. The method of claim 1, wherein:
the generated packet comprises predetermined information indicating that the generated packet was generated by the processor.

4. The method of claim 1, wherein:
the generated packet includes information indicating the first one of the processing engines.

5. The method of claim 1,
further comprising distinguishing between a generated packet and a network packet.

6. The method of claim 1,
further comprising determining whether to modify the first set of program instructions based on the generated packet.

7. A system comprising:
one or more network communication links; and
a processor comprising a plurality of processing engines capable of executing program instructions to process a network packet received via a network interface with a pipeline of packet processing stages provided by different ones of the processing engines, the processor being capable of at least one of receiving and transmitting at least one packet via the one or more network communication links, the processor also being capable of generating at least one other packet, of transmitting the at least one other packet to at least a first one of the processing engines providing at least one of the pipeline of packet processing stages, and in response, at least in part to receipt of the at least one other packet by the first one of the processing engines, the at least one of the processing engines being capable of modifying at least in part, a first set of program instructions providing a stage of the pipeline of packet processing stages that the first one of the processing engines is capable of executing; and transmitting the generated packet from the first one of the processing engines to a second one of the processing engines providing a next one of the stages of the pipeline of packet processing stages; and in response, at least in part to receipt of the generated packet by the second one of the processing engines, modifying at least in part, by the second one of the processing engines, a second set of program instructions providing a stage of the pipeline of packet processing stages that the second processing engine is capable of executing.

8. The system of claim 7, wherein:
the first one of the processing engines is capable of determining whether to modify the set of program instructions based on the generated packet.

9. An apparatus comprising:
a processor capable of generating a packet, the processor comprising a plurality of processing engines capable of executing program instructions to process a network packet received via a network interface with a pipeline of packet processing stages provided by different ones of the processing engines, the processor also being capable of transmitting the generated packet to at least a first one of the processing engines providing at least one stage of the pipeline of packet processing stages, and in response, at least in part to receipt of the generated packet by the first one of the processing engines, the first one of the processing engines being capable of modifying at least in part, a first set of program instructions providing a stage of the pipeline of packet processing stages, the first one of the processing engines to execute the first set of program instructions after the modifying of the first set of program instructions;
the processor also being capable of transmitting the generated packet from the first one of the processing engines to a second one of the processing engines providing a next one of the stages of the pipeline of packet processing stages; and in response, at least in part to receipt of the generated packet by the second one of the processing engines providing the next one of the stages of the pipeline of packet processing stages, modifying at least in part, by the second one of the processing engines, a second set of program instructions providing a stage of the pipeline of packet processing stages, the second one of the processing engines to execute the second set of program instructions after the modifying of the second set of program instructions.

10. The apparatus of claim 9, wherein:
the modifying, at least in part, of the first set of program instructions by the first one of the processing engines comprises replacing at least one program instruction comprised in the first set of program instructions with at least one other program instruction that is one of comprised and specified, at least in part, in the generated packet.

11. The apparatus of claim 9, wherein:
the generated packet comprises predetermined information indicating that the generated packet was generated by the processor.

12. The apparatus of claim 9, wherein:
the generated packet includes information indicating the first one of the processing engines.

13. An article comprising:
a storage medium having stored thereon machine-executable instructions that when executed by a machine result in the following:
generating a packet by a processor that includes a plurality of processing engines programmed to process a network packet received via a network interface with a pipeline of packet processing stages provided by different ones of the processing engines;
transmitting the generated packet to at least a first one of the processing engines providing at least one stage of the pipeline of packet processing stages; and
in response, at least in part to receipt of the generated packet by the first one of the processing engines, modifying at least in part, by the first one of the processing engines, a first set of program instructions, the first set of programming instructions providing a stage of the pipeline of packet processing stages, the first one of the processing engines to execute the first set of program instructions after the modifying of the first set of program instructions;
transmitting the generated packet from the first one of the processing engines to a second one of the processing engines providing a next one of the stages of the pipeline of packet processing stages; and
in response, at least in part to receipt of the generated packet by the second one of the processing engines providing the next one of the stages of the pipeline of packet processing stages, modifying at least in part, by the second one of the processing engines, a second set of program instructions, the second set of programming instructions providing a stage of the pipeline of packet processing stages, the second one of the processing engines to execute the second set of program instructions after the modifying of the second set of program instructions.

14. The article of claim 13, wherein:

the modifying, at least in part, of the first set of program instructions by the first one of the processing engines comprises replacing at least one program instruction comprised in the first set of program instructions with at least one other program instruction that is one of comprised and specified, at least in part, in the generated packet.

15. The article of claim 13, wherein:

the generated packet comprises predetermined information indicating that the generated packet was generated by the processor.

16. The article of claim 13, wherein:

the generated packet includes information indicating the first one of the processing engines.

* * * * *

UNITED STATES PATENT AND TRADEMARK OFFICE
CERTIFICATE OF CORRECTION

PATENT NO.         : 7,000,098 B2  
APPLICATION NO.    : 10/279590  
DATED              : February 14, 2006  
INVENTOR(S)        : Kunze et al.

It is certified that error appears in the above-identified patent and that said Letters Patent is hereby corrected as shown below:

Column 2, at line 35, after the first occurrence of "bus" insert --instead--.  
Column 14, at line 50, delete "processincj" and insert --processing--.  
Column 14, at line 63, delete "Drogram-" and insert --program- --.  
Column 16, at line 3, delete "being".  
Column 16, at line 4, delete "capable of".

Signed and Sealed this

Thirteenth Day of November, 2007

JON W. DUDAS  
*Director of the United States Patent and Trademark Office*